United States Patent
Ouspenski et al.

(10) Patent No.: US 11,522,217 B2
(45) Date of Patent: Dec. 6, 2022

(54) ELECTROLYTE MATERIAL AND METHODS OF FORMING

(71) Applicant: SAINT-GOBAIN CERAMICS & PLASTICS, INC., Worcester, MA (US)

(72) Inventors: Vladimir Ouspenski, Saint-Pierre-lès-Nemours (FR); Gaurav Assat, Paris (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 17/230,625

(22) Filed: Apr. 14, 2021

(65) Prior Publication Data

US 2021/0320326 A1 Oct. 14, 2021

Related U.S. Application Data

(60) Provisional application No. 63/009,827, filed on Apr. 14, 2020.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ....... H01M 10/0525; H01M 2300/008; H01M 10/0562; H01M 10/052; Y02E 60/10; H01B 1/06
USPC ........................................................ 429/323
See application file for complete search history.

(56) References Cited

U.S. PATENT DOCUMENTS

| | | | |
|---|---|---|---|
| 7,132,060 | B2 | 11/2006 | Zagumennyi et al. |
| 8,252,260 | B2 | 8/2012 | Iltis |
| 9,599,727 | B2 | 3/2017 | Ouspenski et al. |
| 10,854,915 | B2 | 12/2020 | Ling et al. |
| 2005/0188914 | A1 | 9/2005 | Iltis et al. |
| 2010/0098613 | A1 | 4/2010 | Iltis |

(Continued)

FOREIGN PATENT DOCUMENTS

| | | |
|---|---|---|
| CN | 108701860 A | 10/2018 |
| CN | 109775744 A | 5/2019 |

(Continued)

OTHER PUBLICATIONS

International Search Report and Written Opinion for PCT/US2021/027289, dated Jul. 26, 2021, 12 pages.

(Continued)

*Primary Examiner* — Gary D Harris
(74) *Attorney, Agent, or Firm* — Abel Schillinger, LLP; Adrian Lawrence

(57) ABSTRACT

A solid electrolyte material can include an ammonium-containing complex metal halide. In an embodiment, the ammonium-containing complex metal halide can be represented by $(NH_4)_n M_{3-z}(Me^{k+})_f X_{n+3-z+k*f}$ wherein $0<n$, $0 \leq z<3$, $2 \leq k <6$, $0 \leq f \leq 1$; M comprises at least an alkali metal element, X comprises a halogen, and Me comprises a divalent metal element, a trivalent metal element, a tetravalent metal element, a pentavalent metal element, a hexavalent metal element or any combination thereof.

20 Claims, 2 Drawing Sheets

(56) References Cited

U.S. PATENT DOCUMENTS

| | | | |
|---|---|---|---|
| 2013/0202971 A1 | 8/2013 | Zhao et al. | |
| 2015/0147619 A1 | 2/2015 | Chae et al. | |
| 2018/0277891 A1* | 9/2018 | Mimura | H01M 10/058 |
| 2019/0088995 A1 | 3/2019 | Asano et al. | |
| 2020/0075993 A1 | 3/2020 | Ling et al. | |
| 2020/0328453 A1 | 10/2020 | Sakai et al. | |
| 2020/0328454 A1 | 10/2020 | Sakai et al. | |
| 2020/0328456 A1 | 10/2020 | Asano et al. | |
| 2020/0328457 A1 | 10/2020 | Sakai et al. | |
| 2020/0350622 A1 | 11/2020 | Sakaida et al. | |
| 2021/0269320 A1 | 9/2021 | Kubo et al. | |
| 2021/0269324 A1 | 9/2021 | Kubo et al. | |
| 2022/0045357 A1 | 2/2022 | Ouspenski et al. | |

FOREIGN PATENT DOCUMENTS

| | | |
|---|---|---|
| CN | 110265708 A | 9/2019 |
| CN | 111279431 A | 6/2020 |
| CN | 111279432 A | 6/2020 |
| CN | 111295720 A | 6/2020 |
| CN | 112928326 A | 6/2021 |
| EP | 3496202 A4 | 8/2019 |
| EP | 3496202 A1 | 12/2019 |
| JP | 2511947 B2 | 7/1996 |
| JP | 2006244734 A | 9/2006 |
| JP | 2018025582 A1 | 5/2019 |
| KR | 20180076132 A | 7/2018 |
| KR | 20200069215 A | 6/2020 |
| KR | 20200075250 A | 6/2020 |
| WO | 2014052439 A1 | 4/2014 |
| WO | 2017192163 A1 | 11/2017 |
| WO | 2018025582 A1 | 2/2018 |
| WO | 2019135315 A1 | 7/2019 |
| WO | 2019135316 A1 | 7/2019 |
| WO | 2019135317 A1 | 7/2019 |
| WO | 2019135318 A1 | 7/2019 |
| WO | 2019135319 A1 | 7/2019 |
| WO | 2019135320 A1 | 7/2019 |
| WO | 2019135321 A1 | 7/2019 |
| WO | 2019135322 A1 | 7/2019 |
| WO | 2019135323 A1 | 7/2019 |
| WO | 2019135328 A1 | 7/2019 |
| WO | 2019135336 A1 | 7/2019 |
| WO | 2019135341 A1 | 7/2019 |
| WO | 2019135342 A1 | 7/2019 |
| WO | 2019135343 A1 | 7/2019 |
| WO | 2019135344 A1 | 7/2019 |
| WO | 2019135345 A1 | 7/2019 |
| WO | 2019135346 A1 | 7/2019 |
| WO | 2019135347 A1 | 7/2019 |
| WO | 2019135348 A1 | 7/2019 |
| WO | 2019146216 A1 | 8/2019 |
| WO | 2019146217 A1 | 8/2019 |
| WO | 2019146218 A1 | 8/2019 |
| WO | 2019146219 A1 | 8/2019 |
| WO | 2019146236 A1 | 8/2019 |
| WO | 2019146292 A1 | 8/2019 |
| WO | 2019146293 A1 | 8/2019 |
| WO | 2019146294 A1 | 8/2019 |
| WO | 2019146295 A1 | 8/2019 |
| WO | 2019146296 A1 | 8/2019 |
| WO | 2019146308 A1 | 8/2019 |
| WO | 2020136952 A1 | 7/2020 |
| WO | 2020136954 A1 | 7/2020 |
| WO | 2020136956 A1 | 7/2020 |
| WO | 2020175171 A1 | 9/2020 |

OTHER PUBLICATIONS

Ahmad, N.H. et al., "Ionic Conductivity and Electrical Properties of Carboxymethyl Cellulose—NH4CI Solid Polymer Electrolytes," Journal of Engineering Science and Technology, Aug. 2016, vol. 11 (8), pp. 1-10.

Asano, T. et al. "Solid Halide Electrolytes with High Lithium-Ion Conductivity for Application in 4 V Class Bulk-Type All-Solid-State Batteries," Advanced Materials, 30 (2018), abstract only.

Baker, D. W. "A comprehensive study of the phase diagram of KxNa1-xNbO3," Applied Physics Letters, 2009, 95, pp. 091903-1-091903-3.

Banerjee, A. et al. "Revealing Nanoscale Solid-Solid Interfacial Phenomena for Long-Life and High-Energy All-Solid-State Batteries," ACS Applied Materials & Interfaces, 2019, pp. A-H.

Bohnsack, A. et al. "Ternäre Halogenide vom Typ A3MX6. IV. [1], Ternäre Halogenide des Scandiums mit Natrium, Na3ScX6 (X = F, Cl, Br): Synthese, Strukturen, Ionenleitfähigkeit," Zeitschrift fuer Anorganische und Allgemenie Chemie, volumen 622, 1, 1996, pp. 173-178, abstract only.

Bohnsack, A. et al. "Ternäre Halogenide vom Typ A3MX6. V. Synthese, Kristallstrukturen und Natrium-Ionenleitfähigkeit der ternären Iodide Na3MI6 (M = Sm, Gd—Dy) sowie der Mischkristalle Na3GdBr6-xIx," Zeitschrift fuer Anorganische und Allgemenie Chemie, volumen 623, 1-6, 1997, pp. 837-843, abstract only.

Bohnsack, A. et al.: "Ternary Halides of the A3 MX 6 Type. VI. Ternary Chlorides of the Rare-Earth Elements with Lithium, Li3MCl6(M=Tb—Lu, Y, Sc): Synthesis, Crystal Structures, and Ionic Motion," Physical Inorganic Chemistry, vol. 623, 1997, abstract only.

Bohnsack, A. et al., "Ternary Halides of the A3MX6 Type. VII. The Bromides Li3MBr6 (M=Sm—Lu, Y) : Synthesis, Crystal Structure, and Ionic Mobility", Physical Inorganic Chemistry, vol. 623, 1997, abstract only.

Boulineau, A. et al. "Structure of Li2MnO3 with different degrees of defects," Solid State Ionics, vol. 180, issue 40, 2010, pp. 1652-1659, abstract only.

Choi, S. et al., "Bio-inspired Self-Healing Electrolytes for Li—S Batteries," Chem 3, 2017, pp. 383-389.

Choi S-J. et al. "LiI-Doped Sulfide Solid Electrolyte: Enabling a High-Capacity Slurry-Cast Electrode by Low-Temperature Post-Sintering for Practical All-Solid-State Lithium Batteries," ACS Applied Materials, 2018, pp. 21404-21412, abstract only.

Choudhury, S. et al., "Solid State polymer electrolytes for high-performance lithium metal batteries," Nature Communications, 2019, V.10, pp. 1-8.

Famprikis, T. et al., "Fundamentals of inorganic solid-state electrolytes for batteries." Nature Materials, 2019, 14 pages.

Feinauer, M. et al. "Unlocking the Potential of Fluoride-Based Solid Electrolytes for Solid-State Lithium Batteries," ACS Appl. Energy Mater. 2019, V.2, N 10, pp. 7196-7203, abstract only.

Fuller, R. et al. "Electrical Conductivity in NH4Cl and ND4Cl Single Crystals," Journal of Physics and Chemistry of Solids, 31 (1970), pp. 1539-1545.

Fuzlin, A. F et al., "Effect on Ammonium Bromide in dielectric behavior based Alginate Solid Biopolymer electrolytes," IOP Conf. Series: Materials Science and Engineering, 342, 2018, pp. 1-8.

Gautam, A. et al. "Rapid crystallization and kinetic freezing of site-disorder in the lithium superionic argyrodite Li6PS5Br," Institute of Physical Chemistry, Justus-Liebig-University Giessen, 2019, 31, 22 pages.

Gombotz, M. et al. "Lithium-Ion Transport in Nanocrystalline Spinel-Type Li[InxLiy]Br4 as Seen by Conductivity Spectroscopy and NMR," Frontiers in Chemistry, Feb. 25, 2020, vol. 8, article 100, pp. 1-10.

Ha, S. et al. "Sodium-Metal Halide and Sodium-Air Batteries," ChemPhysChem, Jun. 20, 2014, abstract only.

Hamadene, M. et al. "Phase transition, ferroelasticity and ferroelectricity in Li3InF6," Materials Letters, 27, 1996, pp. 33-39.

Hull, S. et al. "Superionics: crystal structures and conduction processes," Institute of Physics Publishing, Reports on Progress in Physics, 67, 2004, pp. 1233-1314.

Kahle, L. et al. "High-throughput computational screening for solid-state Li-ion conductors," Energy & Environmental Science, Issue 3, 2020, abstract only.

Kerman, Kian et al., "Review—Practical Challenges Hindering the Development of Solid State Li Ion Batteries," Journal of The Electrochemical Society, 164 (2017), pp. A1731-A1744.

(56) References Cited

OTHER PUBLICATIONS

Lau, J. et al., "Sulfide Solid Electrolytes for Lithium Battery Applications," Advanced Energy Materials, 2018, 8, pp. 1-24.

Lee, Y-G. et at., "High-energy long-cycling all-solid-state lithium metal batteries enabled by silver-carbon composite anodes," Nature Energy, 2020, vol. 5, pp. 299-308, abstract only.

Li, X. et al., "Air-stable Li3InCl6 electrolyte with high voltage compatibility for all-solid-state batteries," Energy & Environmental Science 12(9), 2019, pp. 2665-2671.

Li, X. et al., "Water-Mediated Synthesis of a Superionic Halide Solid Electrolyte," Angew Chem Int Ed Engl., 2019, 58, pp. 16427-16432.

Li, X. et al. "Progress and perspectives on halide lithium conductors for all-solid-state lithium batteries," Energy & Environmental Science, vol. 13, Royal Society of Chemistry, Mar. 3, 2020, pp. 1429-1461.

Liang, J. et al. "Site-Occupation-Tuned Superionic LixScCl3+x Halide Solid Electrolytes for All-Solid-State Batteries," Journal of the American Chemical Society, Mar. 26, 2020, 27 pages.

Liu, Z. et al. "High Ionic Conductivity Achieved in Li3Y(Br3Cl3) Mixed Halide Solid Electrolyte via Promoted Diffusion Pathways and Enhanced Grain Boundary," ACS Energy Letters, 2021, 6, pp. 298-304.

Mattfeld, H. et al. "Ternare Halogenide vom Typ A3MX6. I A3YCl6 (A = K, NH4, Rb, Cs): Synthese, Strukturen, Thermisches Verhalten. Über einige analoge Chloride der Lanthanide," Zeitschrift fuer Anorganische und Allgemenie Chemie, volumen 618, 12, 1992, pp. 13-17, abstract only.

Mauger, A. et al. "Building Better Batteries in the Solid State: A Review," Materials, 2019, 12, 3892, pp. 1-86.

Mcguire, M. et al. "Crystal and Magnetic Structures in Layered, Transition Metal Dihalides and Trihalides," Materials Science and Technology Division, Oak Ridge National Laboratory, 2017, pp. 1-17.

Meyer, G. et al., "An Analysis of the Ammonium Chloride Route to Anhydrous Rare-Earth Metal Chlorides," Materials Research Bulletin, vol. 17, 1982, pp. 1447-1455, abstract only.

Meyer, G. et al., "Simple and Complex Halides," Handbook on the Physics and Chemistry of Rare Earths, vol. 28, 2000, pp. 53-129.

Meyer, G. et al. "The Ammonium-Bromide Route to Anhydrous Rare Earth Bromides Mbr3" Journal of the Less-Common Metals, 127, 1987, pp. 155-160.

Muy, S. et al., "'High-Throughput Screening of Solid-State Li-Ion Conductors Using Lattice-Dynamics Descriptors,'" Science, vol. 16, 2019, pp. 270-282.

Nagel, R. et al., "6Li and 7Li MAS NMR Studies on Fast Ionic Conducting Spinel-Type Li2MgCl4, Li2-xCuxMgCl4, Li2-xNaxMgCl4, and Li2ZnCl4," Journal of Solid State Chemistry 165 (2002),pp. 303-311.

Ohno, S. et al. "Materials design of ionic conductors for solid state batteries," Progress in Energy, 2020, 20, 36 pages.

Owens, Boone B. et al., "High-conductivity solid electrolytes: MAg4I5." Science, vol. 157, Issue 3786 (1967), pp. 308-310, abstract only.

Park, K-H. et al., "High-Voltage Superionic Halide Solid Electrolytes for All-Solid-State Li-Ion Batteries," ACS Energy Letters,Jan. 30, 2020, 5, pp. 533-539.

Qie, Y. et al. "Yttrium-Sodium Halides as Promising Solid-State Electrolytes with High Ionic Conductivity and Stability for Na-Ion Batteries," The Journal of Physical Chrmistry Letters, 2020, 11, pp. 3376-3383.

Quinzeni, I. et al., "Stability of low-temperature Li7La3Zr2O12 cubic phase: The role of temperature and atmosphere," Materials Chemistry and Physics, 2017, V.185, pp. 55-64, abstract only.

Saha, S. et al. "Exploring the Bottlenecks of Anionic Redox in Li-rich 1 Layered Sulfides," Nature Energy, 4 (11), 2019, pp. 1-25.

Saha, S. et al. "Polymorphism in Li 4 Zn(PO4) 2 and Stabilization of its Structural Disorder to Improve Ionic Conductivity," Chemistry of Materials, American Chemical Society, 2018, 30(4), pp. 1379-1390.

Samson, A. J., et al., "A bird's-eye view of Li-stuffed garnet-type Li7La3Zr2O12 ceramic electrolytes for advanced all-solid-state Li batteries," Energy & Environmental Science, Issue 10, 2019, abstract only.

Samsudin, A.S. et al., "Ionic conduction study of enhanced amorphous solid bio-polymer electrolytes based carboxymethyl cellulose doped NH4Br," Journal of Non-Crystalline Solids, 2018, V. 497, pp. 19-29, abstract only.

Schlem, R. et al. "Lattice Dynamical Approach for Finding the Lithium Superionic Conductor Li3ErI6," ACS Applied Energy Materials, 2020, 3, 4, pp. 3684-3691, abstract only.

Schlem, R. et al., "Mechanochemical Synthesis: A Tool to Tune Cation Site Disorder and Ionic Transport Properties of LI3MCl6 (M = Y, Er) Superionic Conductors," Advanced Energy Materials, 2019, pp. 1-10.

Sendek, A. D. et al. "Machine Learning-Assisted Discovery of Solid Li-Ion Conducting Materials," Chemistry of Materials, 2018, abstract only.

Shao, C. et al.,"Structure and ionic conductivity of cubic Li7La3Zr2O12 solid electrolyte prepared by chemical coprecipitation method," Solid State Ionics , 2016, V. 287, pp. 13-16.

Sit, Y. K., "Ionic Conductivity Study on Hydroxyethyl Cellulose (HEC) doped with NH4Br Based Biopolymer Electrolytes," Research Journal of Recent Sciences, vol. 1 (11), 2012, pp. 16-21.

Steiner, H-J. et al., "Neue schnelle Ionenleiter vom Typ MMIIICl6 (MI = Li, Na, Ag; MIII = In, Y)" Zeitschrift für anorganische und allgemeine Chemie 613 (1992), pp. 26-30.

Stenzel, F. et al. "Ternäre Halogenide vom Typ A3MX6. II. Das System Ag3-xNaxYCl6: Synthese, Strukturen, Ionenleitfähigkeit," Zeitschrift fuer Anorganische und Allgemenie Chemie, volumen 619, 4, 1993, pp. 652-660, abstract only.

Sun, Y. et al., "Thermodynamic optimization and calculation of the YCl3—ACl (A=Li, Na, K, Rb, Cs) phase diagrams" Calphad, vol. 39 (2012), pp. 1-10.

Tomita, Y. et al. "Substitution effect of ionic conductivity in lithium ion conductor, LI3INBR6-xCLx," Solid State Ionics, 179, 2008, pp. 867-870.

Wang, C. et al., "Stabilizing interface between Li10SnP2S12 and Li metal by molecular layer deposition," Nano Energy (2018), V.53, pp. 168-174.

Wang, S. et al., "Lithium Chlorides and Bromides as Promising Solid-State Chemistries for Fast Ion Conductors with Good Electrochemical Stability." Angewandte Chemie International Edition, 58.24 (2019), 8039-8043.

Wentker, M. et al., "Bottom-Up Approach to Lithium-Ion Battery Cost Modeling with a Focus on Cathode Active Materials," Energies, 2019, 12, 504, pp. 1-18.

Wickleder, M. et al. "Ternäre Halogenide vom Typ A3MX6. III. Synthese, Strukturen, Ionenleitfähigkeit der Halogenide Na3MX6 (X = Cl, Br)," Zeitschrift fuer Anorganische und Allgemenie Chemie, volumen 621, 3,1995, pp. 457-463, abstract only.

Wu, J-F. et al., "Garnet-Type Fast Li-Ion Conductors with High Ionic Conductivities for All-Solid-State Batteries," ACS Appl. Mater. Interfaces 2017, V.9, pp. 12461-12468, abstract only.

Xiao, Y. et al. "Computational Screening of Cathode Coatings for Solid-State Batteries," Joule, 3, 2019, pp. 1252-1275.

Xue, W. et al.,"The effect of sintering process on lithium ionic conductivity of Li6.4Al0.2La3Zr2O12 garnet produced by solid-state synthesis," The Royal Society of Chemistry Adv, 2018, V.8, pp. 13083-13088.

Yeandel, S. et al. "Structure and Lithium Ion Dynamics in Fluoride Doped Cubic LLZO (Li7La3Zr2O12) Garnet for Li Solid State Battery Applications," The Journal of Physical Chemistry, 2018, 31 pages.

Yu, C. et al. "Facile Synthesis toward the Optimal Structure-Conductivity Characteristics of the Argyrodite Li6PS5Cl Solid-State Electrolyte," Applied Materials & Interfaces, 2018, 10, 33296-33306.

Yu, S. et al. "Thermodynamic Assessment of Coating Materials for Solid-State Li, Na, and K Batteries," ACS Applied Materials & Interfaces, 2019, pp. 1-10.

(56) References Cited

OTHER PUBLICATIONS

Yu, H. et al. "High-energy 'composite' layered manganese-rich cathode materials via controlling Li2MnO3 phase activation for lithium-ion batteries," Physical chemistry chemical physics, 2012, abstract only.

Zevgolis, A. et al. "Alloying Effects on Superionic Conductivity in Lithium Indium Halides for All-Solid-State Batteries," Applied Physics Letters Materials, 2017, 16 pages.

Zhang, S. et al. "Advanced High-Voltage All-Solid-State Li-Ion Batteries Enabled by a Dual-Halogen Solid Electrolyte," Advanced Energy Materials, 2021, 10 pages.

Zhang, T. et al., "Ammonia, a Switch for Controlling High Ionic Conductivity in Lithium Borohydride Ammoniates," Joule 2, Elsevier Inc., 2018, pp. 1522-1533.

Zhang, T. et al. "Designing composite solid-state electrolytes for high performance lithium ion or lithium metal batteries," Chemical Science, Royal Society of Chemistry, Jul. 20, 2020, pp. 8686-8707.

Zhang, Z. et al., "New horizons for inorganic solid state ion conductors," Energy & Environmental Science, 2018, V.11, pp. 1945 1976.

Zhao, Y. et al., "Superionic Conductivity in Lithium-Rich Anti-Perovskites," Journal of the American Chemical Society 134(36), (2012), abstract only.

Zhou, L. et al. "New Family of Argyrodite Thioantimonate Lithium Superionic Conductors," Journal of the American Chemical Society, 2019, 141, pp. 19002-19013.

* cited by examiner

ELECTROLYTE MATERIAL AND METHODS OF FORMING

CROSS-REFERENCE TO RELATED APPLICATIONS

This application claims priority under 35 U.S.C. § 119(e) to U.S. Provisional Patent Application No. 63/009,827, filed Apr. 14, 2020, by Vladimir OUSPENSKI, et al., entitled "ELECTROLYTE MATERIAL AND METHODS OF FORMING," which is assigned to the current assignee hereof and incorporated herein by reference in its entirety for all purposes.

FIELD OF THE DISCLOSURE

The following is directed to an electrolyte material and methods of forming the same, and to, in particular, a solid electrolyte material including ammonium-containing complex metal halide and methods of forming the same.

DESCRIPTION OF THE RELATED ART

Solid-state lithium batteries, by enabling lithium metal anode, are expected to provide higher energy densities and faster recharging times and cause less safety concerns compared to conventional lithium-ion batteries. Current solid electrolyte materials include oxides, halides, sulfides, fluorides, and solid polymer electrolytes.

Oxide based materials have been considered safe and possessing good chemical and electrochemical stability. The synthesis of these compounds generally uses high temperatures that are above 1000-1200° C. The oxide based materials are typically dense, rigid, and brittle with ionic conductivity up to 1.0 mS/cm at room temperature ($IC_{RT}$).

Halide compounds, such as chlorides and bromides, are generally safe and have good chemical and electrochemical stability, deformability and plasticity, allowing relatively high compatibility with active electrode materials. Some $Li_3YCl_6$ (LYC) and $Li_3YBr_6$ (LYB) electrolytes have demonstrated room temperature ionic conductivity $IC_{RT}$ above 1 mS/cm. Halides are generally hygroscopic and form hydrates or undergo hydrolysis upon exposure to moisture. Halide solid electrolytes, such as LYC and LYB, are synthesized by using high energy ball milling based solid-state synthesis methods. The synthesis possesses challenges for mass production applications, further because expensive binary halide reactants and/or high temperature annealing are used.

Fluorides are very similar to oxides in physical, chemical, and electrochemical properties, but in general have $IC_{RT}$ values below 1 mS/cm.

Sulfides have relatively high ionic conductivity. For instance, $IC_{RT}$ can be as high as 25 mS/cm while commercially relevant sulfide or thiophosphate solid electrolytes can achieve 2-10 mS/cm. Sulfides materials are mechanically softer and deformable. However, sulfides materials tend to have poor electrochemical stability and cause safety concerns due to the risk of releasing toxic $H_2S$ gas when accidentally reacting together with water and heat. Further, high surface area sulfide solid electrolyte powders pose a particularly high $H_2S$ risk due to their increased reactivity even with ambient humidity.

Solid polymer electrolytes containing lithium salts in general have relatively low $IC_{RT}$ values and electrochemical stability.

The industry continues to demand improved solid electrolyte materials.

BRIEF DESCRIPTION OF THE DRAWINGS

The present disclosure may be better understood, and its numerous features and advantages made apparent to those skilled in the art by referencing the accompanying drawings.

Figure 1:
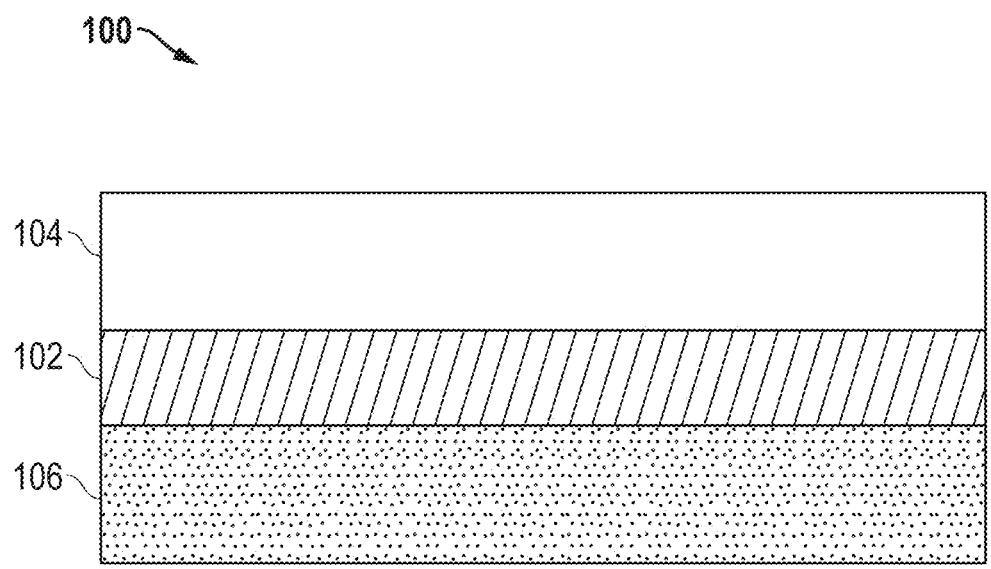
FIG. 1 includes a cross-sectional illustration of a portion of solid-state lithium battery according to an embodiment.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to a solid electrolyte material including an ammonium-containing complex metal halide. The metal can include at least one alkali metal element. The solid electrolyte material can have improved bulk ion conductivity. In embodiments, the solid electrolyte material can be used to form a solid state electrolyte, an anode, and/or a cathode. In particular embodiments, the solid electrolyte material can be a suitable component of a solid-state battery. A more particular example of the solid-state battery can include a solid-state lithium battery.

Embodiments relate to methods of forming the solid electrolyte material. The method can allow massive production of the solid electrolyte material in a cost efficient manner.

In an embodiment, the solid electrolyte material can include an ammonium-containing complex metal halide represented by $(NH_4)_n M_{3-z}(Me^{k+})_f X_{n+3-z+k*f}$, wherein $0<n$; $-3 \leq z \leq 3$; $2 \leq k < 6$; $0 \leq f \leq 1$; M can include an alkali metal element; X can include a halogen; and Me can include a metal element. In a particular aspect, f is not zero. In another particular aspect, $0 \leq z < 3$. In still another aspect, $0 \leq z \leq 3$. In another particular aspect, z can be 3, and n may be 0.5 or 1 or 2 or 3 or 4.

In an embodiment, the solid electrolyte material can include an ammonium-containing complex metal halide represented by $(NH_4)_n M_{3-z} Me^{k+} X_{n+3-z+k}$, wherein $0<n$; $0 \leq z < 3$; $2 \leq k < 6$; M can include an alkali metal element; X can include a halogen; and Me can include a metal element.

In an aspect, ammonium may make up at most 50 mol % of the total of ammonium and M, such as at most 40 mol %, at most 30 mol %, or at most 20 mol % of the total of ammonium and M. In another aspect, ammonium may make up at least 10 mol % of the total of ammonium and M, such as at least 14 mol %, at least 20 mol %, or at least 25 mol % of the total of ammonium and M. In another aspect, ammonium can be present in a range including any of the minimum and maximum percentages noted herein.

In an aspect, M can be one or more metal elements including an alkali metal element. In an example, M can include Li. In another example, M can include Li and another alkali metal, such as Na, K, Cs, Rb, or any combination thereof. In a further example, M can be Na or a combination of Na and at least one of Cs and Rb. In particular instances, M can be a combination of Li and Cs.

In another aspect, M may consist of one or more alkali metal element. For example, M can be Li or a combination of Li and another alkali metal. In another example, M can consist of at least one of Li and Na. In still another example, M can consist of Li and Na.

In particular implementations, Na can make up at most 40 mol % of M, such as at most 34 mol % of M. For example, M can include from 0 mol % to 40 mol % of Na. In particular examples, M can include up to 20 mol % of Na, or even more particularly, up to 10 mol % of Na. In at least one instance, Na can make up from 40 mol % to 100 mol % of M.

In further particular implementations, Li can make up at least 50 mol %, or at least 60 mol %, or at least 66 mol %, or at least 75 mol % of M. In a particular example, M can include from 60 mol % to 100 mol % Li.

In another instance, Cs can make up at least 25 mol % of M, such as at least 30 mol %, at least 40 mol %, or at least 50 mol % of M. In another instance, Cs may make up at most 50 mol %, or at most 40 mol %, or at most 30 mol %, or at most 20 mol %, or at most 10 mol % of M. In particular instances, Cs may make up at most 1 mol % of M.

In an aspect, X can include at least one of Cl, Br, I, and F. For example, X can include Cl or Br. In another example, X can include F. In another example, X can include at least two of Cl, Br, and I. In still another example, X can include all of Cl, Br, and I.

In an embodiment, X may include elements other than halogen. In some implementations, X can include an anion group in addition to a halogen. Such anion group can include amide (—NH$_2$), —(NH)$_{0.5}$ (imide), hydroxide (—OH), borohydride (—BH$_4$), —BF$_4$, or a combination thereof. The anion group may be included as an impurity or a dopant. In particular aspects, X can consist of at least one of Cl, Br, F, and I and optionally at least one of amide (—NH$_2$), hydroxide (—OH), BH$_4$ and —BF$_4$. For example, X can consist of one or both of Cl and Br and at least one of amide (—NH$_2$), —(NH)$_{0.5}$ (imide), hydroxide (—OH), —BH$_4$ and —BF$_4$. In a further example, X may consist of F and at least one of amide (NH$_2$), hydroxide (—OH), —BH$_4$ and —BF$_4$. In at least one embodiment, X may be one or more halogen.

In an aspect, Me can include a divalent metal element, a trivalent metal element, a tetravalent metal element, a pentavalent metal element, a hexavalent metal element, or any combination thereof. In instances Me includes more than one metal elements, k can be the average of the total of the valence of each Me metal element. For example, when Me includes a trivalent element and tetravalent element in equal molar quantity, k=(3+4)/2=3.5. In a particular aspect, k may be 3 or 4 or 5.

An exemplary divalent metal element can include an alkaline earth element, such as Mg and/or Ca, Zn, or any combination thereof. In particular implementations, Me can include Zn, Ca, or any combination thereof. In particular implementations, ions having relatively smaller radius, such as Zn and Mg, may be particularly suitable when the halogen includes or consist of Cl; and ions having relatively larger radius, such as Ca, may be particularly suitable when the halogen includes or consists of Br. In another particular implementation, including a substituting ion having a radius larger than the base ion may help enlarge ion-conducting channels in the electrolyte material. For example, Me can include Ca and Y, wherein Ca can be suitable to partially substitute Y. In another implementation, a divalent element having a relatively light weight, such as Mg, Zn, and Ca, may be preferred. In certain instances, substituting Y with Sr or Ba may result in formation of compounds of SrX$_2$ or BaX$_2$, which may be an impurity impacting bulk ionic conductivity of the complex metal halide.

An exemplary trivalent metal element can include a rare earth element including Ce, Dy, Er, Eu, Gd, Ho, La, Lu, Nd, Pr, Pm, Sm, Sc, Tb, Tm, Yb, Sc and Y, a trivalent metal other than rare earth element, such as In, Ga, Al or Bi, or any combination thereof. In particular examples, Me can include Sc, Y, La, Gd, or any combination thereof. In more particular instances, Me can include Y, Gd, or a combination thereof.

An exemplary tetravalent metal element can include Zr, Hf, Ti, Sn, Ge, Th, or any combination thereof. In particular examples, Me can include Zr and Hf. In another particular example, Me can include Zr.

An exemplary pentavalent element can include Ta, Nb, W, Sb, or any combination thereof.

In a further aspect, Me can include a rare earth element including Y, Gd, La, and/or Sc, an alkaline earth metal element, 3d transition metals, Zn, Zr, Hf, Ti, Sn, Th, Ta, Nb, Mo, W, Sb, In, Bi, Al, Ga, Ge or any combination thereof. In particular examples, Me can include Y, Gd, Zr, or any combination thereof. In particular instances, Me can include Y that is partially substituted by another Me element. For instance, Y may be substituted by a particular content of another Me element that can facilitate improved crystalline structure and/or property of the complex ammonium-containing metal halide. In a particular example, Me can include up to 70 mol % of Y and from 5 mol % to 30 mol % of substitution Me element. In a further example, Y may be partially substituted by an Me element having a suitable effective ionic radius that may allow formation of a stable phase of the complex metal halide. In particular example, the Me element may have an ionic radius that is smaller than the effective ionic radius of La, 103.2 A and at least similar to the effective ionic radius of Li, 0.76 A. In more particular examples, the Me element may have an effective ionic radius from 0.76 A±5% to 93.5 A±5%.

In a particular implementation, Me can consist of Gd, Y, Ce, Er, Zr, Yb, or any combination thereof. For example, Me can consists of Y. In another example, Me can consist of Y and at least one of Ce, Er, Zr, and Gd. In a further example, Me consists of Yb and Ce. In another example, Me can consist of two or more of In, Y, Zr, Hf, Sc, Zn, and Mg.

In a particular example, M can be Li, Me can be a combination of In, Mg, Zr, and Sc, and X can be Cl or a combination of Cl and an anion group.

In another particular example, M can be Li, Me can be Y, Zr, and Hf, and X can be Cl or a combination of Cl and an anion group.

In another particular example, M can be Na, Me can be Zr, and X can be Cl or a combination of Cl and an anion group.

In particular embodiments, the complex ammonium-containing metal halide can be represented by $(NH_4)_n(Li_{(1-d-e)}Na_{(d)}M'_{(e)})_2Li_{(1-z)}Me^{3+}_{(1-u-p-q-r)}Me^{4+}_{(u)}Me^{2+}_{(p)}Me^{5+}_{(q)}Me^{6+}_{(r)}(Cl_{(1-y-w)}Br_{(y)}I_{(w)})_{(6+u-p+2q+3r-z+n)}$, wherein $n>0$; $0 \leq d<1$; $0 \leq e<1$; $(d+e) \leq 1$; M' can be Cs, Rb, K, or any combination thereof; $Me^{4+}$ is $Zr^{4+}$, $Hf^{4+}$, $Ti^{4+}$, $Sn^{4+}$, $Th^{4+}$, $Ge^{4+}$, or any combination thereof; $Me^{3+}$ is a trivalent rare earth element, $In^{3+}$, $Y^{3+}$, $Sc^{3+}$, $Bi^{3+}$, $Al^{3+}$, $Ga^{3+}$, or any combination thereof; $Me^{2+}$ is $Mg^{2+}$, $Zn^{2+}$, $Sr^{2+}$, $Ba^{2+}$, $Yb^{2+}$, $Eu^{2+}$ or any combination thereof; $Me^{5+}$ is $Ta^{5+}$, $Nb^{5+}$, $W^{5+}$, $Sb^{5+}$, or any combination thereof; $Me^{6+}$ is $W^{6+}$ or $Mo^{6+}$; $0<=w<=1$; $0<=y<=1$; $-1 \leq z \leq 1$; $0<=u<0.95$; $0<=p<0.95$; $0<=q<0.95$; and $0<=r<0.95$. In a particular aspect, n=0.5 or 1 or 2 or 3 or 4 and z=1. In another particular aspect, $0 \leq z<1$. In a more particular aspect, d=e=0, p=0, q=0, and r=0, and in even more particular aspect, w=0.

In another particular embodiment, the ammonium-containing complex metal halide may be represented by $(NH_4)_n Li_3(Me^{k+})_f X_{3+k*f+n}$, wherein Me can include a rare earth element, Zr, or a combination thereof; $n>0$; $0 \leq f \leq 1$; X includes a halogen and optionally an anion group, such as amide (—NH2), —(NH)$_{0.5}$ (imide), hydroxide (—OH), and —BF4; and k may be 3 or 4 or 5. In an aspect, f is not zero. In particular aspects, f=1. Particular example of Me may include Y, Gd, Sc, Zr, or a combination thereof. Particular examples of ammonium-containing complex metal halide can include $(NH_4)_3Li_3YCl_9$, $(NH_4)_3Li_3Y_{0.8}Gd_{0.2}Br_9$, $(NH_4)_3Li_3Y_{0.8}Gd_{0.2}Cl_9$, $(NH_4)_3Li_3InCl_9$, $(NH_4)_3Li_3Mg_{0.2}Y_{0.6}Zr_{0.2}Cl_9$, $(NH_4)_3Li_3YBr_9$, or the like, or any combination thereof.

In another particular embodiment, the ammonium-containing complex metal halide may be represented by $(NH_4)_n(Li_{1-d}Na_{1-d})_2LiMe^{k+}X_{3+k+n}$, wherein Me can include a rare earth element, Zr, or a combination thereof; $n>0$; $0 \leq d<1$; X includes a halogen and optionally an anion group such as (—NH$_2$), —(NH)$_{0.5}$ (imide), hydroxide (—OH), and —BF$_4$; and k may be 3 or 4 or 5. In more particular examples, Me may include Y, Sc, Gd, Zr, or a combination thereof. Exemplary particular ammonium-containing complex metal halide of such may include $(NH_4)_3(Li_{0.5}Na_{0.5})_3YCl_9$, $(NH_4)_3 (Li_{0.5}Na_{0.5})_3YBr_9$, $(NH4)_3Cs_2LiYBr_9$, $(NH_4)LiCsCl_3$, or $NH_4Li_2CsCl_4$, or the like, or any combination thereof.

In an embodiment, the ammonium-containing complex metal halide can be constituted of $A_t$ and $B_{(1-t)}$, wherein $10^{-6}<t \leq 1$; A includes ammonium; and B is free of ammonium.

In an example, A can be represented by $(NH_4)_n Li_{3-z}(Me^{k+})_f X_{3-z+k*f+n}$, and B can be represented by $(Li_{1-d-e}Na_d M_e)_2 Li_{1-z'}(Me'^{k+})_f X_{3-z'+k*f'}$ wherein Me and Me' can independently include a rare earth element, Zr, a divalent metal element, a trivalent metal element other the rare earth, a tetravalent metal element other than Zr, a pentavalent element, a hexavalent element or any combination thereof; M can be K, Rb, Cs, or any combination thereof; $2 \leq k \leq 6$; $0 \leq d \leq 1$; $0 \leq e<1$; $-1 \leq z' \leq 1$; $0 \leq f \leq 1$; $0 \leq f' \leq 1$; $0<n$, $0 \leq z \leq 3$. In a particular instance, d is less than 1. In a further particular instance, z is not zero. In another particular instance, f' is greater than 0. In particular instances, n=0.5 or 1 or 2 or 3 or 4 when z=3.

In particular examples, A can be represented by $(NH_4)_n Li_3 Me^{k+} X_{3+k+n}$, and B can be represented by $(Li, Na)_2 LiMe'^{k+} X_6$, wherein Me and Me' can independently include a divalent metal element, a trivalent metal element, a tetravalent metal element, a pentavalent element, or any combination thereof; $2 \leq k<6$; $n>0$; and X includes at least one halogen. In more particular examples, k may be 3 or 4 or 5; n may be 0.5 or 1 or 2 or 3; and Me can include a rare earth element, Zr, or a combination thereof.

In particular examples, A can be represented by $(NH_4)_n Li_3 Me^{k+} X_{3+k+n}$, and B can be represented by $(Li, Cs)_2 LiMe'^{k+} X_6$, wherein Me and Me' can independently include a divalent metal element, a trivalent metal element, a tetravalent metal element, a pentavalent element, or any combination thereof; $2 \leq k<6$; $n>0$; and X includes at least one halogen. In more particular examples, k may be 3 or 4 or 5; n may be 0.5 or 1 or 2 or 3; and Me can include a rare earth element, Zr, or a combination thereof.

In an embodiment, the ammonium-containing complex metal halide can consist of a single phase including A and B. In particular examples, the single phase may be a solid solution constituted of $A_t$ and $B_{(1-t)}$.

In another embodiment, the ammonium-containing complex metal halide can include a plurality of phases. For example, A may be present in a first phase, and the first phase may be free of B. B may be present in a second phase, and the second phase may be free of A. In another example, the second phase may consist of B. In particular examples, the plurality of phases may be present in a eutectic-like intimate mixture.

It is notable A can improve ion conductivity of B, and the ammonium-containing complex metal halide having the composition of $A_t+B_{(1-t)}$ can have improved ion conductivity over the complex metal halide having the composition of B.

In an embodiment, the ammonium-containing complex metal halide may have a particular t that can facilitate improved ion conductivity of the electrolyte material. For example, t can be greater than $10^{-6}$, such as at least $10^{-5}$, at least $10^{-4}$, at least $10^{-3}$, at least $10^{-2}$, or at least 0.05. In another instance, t may be at most 0.5, such as at most 0.4, at most 0.3, or at most 0.2. Moreover, t can be in a range including any of the minimum and maximum values noted herein. In particular implementations, t may be a bulk ion conductivity enhancer parameter. For instance, in particular applications of an ammonium-containing complex metal halide, a greater t may indicate higher bulk ion conductivity for the ammonium-containing complex metal halide.

In an embodiment, the ammonium-containing complex metal halide can have ionic conductivity in bulk. In an aspect, the ammonium-containing complex metal halide can exhibit an ionic conductivity at least 0.001 mS/cm, at least 0.01 mS/cm, at least 0.1 mS/cm, or at least 0.5 mS/cm. In another aspect the ammonium-containing complex metal halide can ion conductivity of greater than 0.5 mS/cm. For example, the bulk ion conductivity can be at least 0.6 mS/cm, at least 1.2 mS/cm, at least 1.8 mS/cm, or at least 2.2 mS/cm. In another example, the bulk ion conductivity can be at most 15 mS/cm, at most 13 mS/cm, at most 11 mS/cm, at most 8 mS/cm, at most 7.2 mS/cm, or at most 6.2 mS/. In a particular example, the bulk ion conductivity can be in a range including any of the minimum and maximum values noted herein.

Ionic conductivity in bulk can be measured at 22° C. and activation energy of 0.2 eV to 0.5 eV. In further instances, the activation energy from 0 to 1 eV may be used for the temperature from 200° C. to −80° C. For the temperature from 80° C. to −30° C., the activation energy may be from 0.1 to 0.6 eV. For above 0° C. or below 10° C., the activation energy can be from 0.1 to 0.5 eV.

In another embodiment, the ammonium-containing complex metal halide can exhibit ionic conductivity in bulk of at least 0.01 mS/cm to at most 15 mS/cm for a temperature range from −80° C. to 200° C. or for a temperature range from −30° C. to 80° C.

In a further embodiment, the ammonium-containing complex metal halide can include a bulk ion conductivity of at least 0.5 mS/cm to at most 15 mS/cm for each temperature in the range from −80° C. to 200° C. at the activation energy of 0.2 eV to 0.5 eV.

In a further embodiment, A can be represented by $(NH_4)Me^{k+}X_{k+n}$, and B can be represented by $M_2Li(Me^{k+})_fX_{3+k*f}$, wherein M can include at least one alkali metal element, Me can include a rare earth element, Zr, or a combination thereof; and Zr; n=0.5 or 1 or 2 or 3; and where $0<f\leq1$, and k is valence of Me and X can include at least one halogen and optionally, an anion group including ($-NH_2$), $-(NH)_{0.5}$ (imide), hydroxide ($-OH$), $-BH_4$, $-BF_4$, or a combination thereof. In a particular example, Me can be at least one element selected from the group consisting of a rare earth element and Zr. In particular examples, Me can be Y, Zr, Gd, Sc, Er, or any combination thereof. In more particular examples, Me can be Y or Gd or a combination of two or more of Y, Zr, and Gd. In an aspect, M can include Li, Na, Rb, Cs, K, or any combination thereof. In particular examples, M includes Li. In another particular example, M includes Na. In another particular example, M includes Cs. In more particular examples, M can be Li or a combination of Li and at least one of Na and Cs. In another aspect, Li can consist of Li and at least one of Na, Cs, Rb, and K. In a further aspect, M can consist of Li and Na. In still another aspect, M can consist of Na and at least one of Cs, Rb, and K. In an example, X can consist of a halogen and optionally an anion group. In a particular example, the halogen can include at least one, at least two, or at least three of Cl, Br, F, and I.

In an embodiment, A can be represented by $(NH_4)_3Me^{k+}X_{3+k}$, and B can be represented by $Li_3Me^{k+}X_{3+k}$, wherein Me can include a rare earth element, Zr, or a combination thereof, and X includes one or more halogen and optionally an anion group. In particular examples, Me can be Y, Zr, Gd, Sc, Er, or any combination thereof. In more particular examples, Me can be Y or Gd or a combination of two or more of Y, Zr, and Gd. In an example, X can consist of a halogen and optionally an anion group. In a particular example, the halogen can include at least one, at least two, or at least three of Cl, Br, F, and I.

In an embodiment, A can be represented by $(NH_4)_3Li_3Me^{k+}X_{6+k}$, and B can be represented by $Li_3MeX_6$, wherein Me can include a rare earth element, Zr, or a combination thereof, and X includes one or more halogen and optionally an anion group. In particular examples, Me can be Y, Zr, Gd, Sc, Er, or any combination thereof. In more particular examples, Me can be Y or Gd or a combination of two or more of Y, Zr, and Gd. In an example, X can consist of a halogen and optionally an anion group. In a particular example, the halogen can include at least one, at least two, or at least three of Cl, Br, F, and I.

In particular embodiments, A can be represented by $(NH_4)_3Li_3YX_9$, and B can be represented by $(Li_{1-d}Na_d)_2LiMe^{k+}X_{3+k}$, wherein Me can include a rare earth element, Zr, or any combination thereof; $0\leq d<1$; and X can include one or more halogen and optionally an anion group such as ($-NH_2$), $-(NH)_{0.5}$ (imide), hydroxide ($-OH$), and $-BF_4$. In particular examples, X can consist of a halogen and optionally an anion group. In another example, X can consist of at least one halogen and at least one anion group. In a further example, the halogen can include at least one, at least two, or at least three of Cl, Br, F, and I. In a particular example, the halogen can be Cl. In another particular example, the halogen can be Br or a combination of Br and Cl. In yet another particular example, the halogen can be a combination of Cl, Br, and I. In still another particular example, the halogen can be F.

In an embodiment, A can be represented by $(NH_4)_3Me^{k+}X_{3+k}$, and B can be represented by $(Li_{1-d}Na_d)_2LiMe^{k+}X_{3+k}$, wherein Me can include a rare earth element, Zr, or any combination thereof; $0\leq d<1$; and X can include one or more halogen and optionally an anion group such as ($-NH_2$), hydroxide ($-OH$), and $-BF_4$. In particular examples, d may be greater than 0, such as at least 0.2. In another particular example, d may be at most 0.5. In particular examples, Me can include Y, Gd, Zr, Sc, or a combination thereof. In a further example, the halogen can include at least one, at least two, or at least three of Cl, Br, and I. In a particular example, the halogen can be Cl, Br, or a combination of Cl and Br. In another particular example, the halogen can be a combination of Cl, Br, and I. In still another particular example, the halogen can be F.

In a particular embodiment, A can be represented by $(NH_4)YX_{3+n}$, n=0.5, 1, 2, 3 and B can be represented by $M_2LiREX_6$, wherein M can be Li or Li and Na or Li and Cs, RE can include at least one rare earth element, and X includes at least one halogen.

In a particular embodiment, A can be represented by $(NH_4)_3YX_6$, and B can be represented by $(Li_{1-d}Na_d)_2LiMe^{k+}X_{3+k}$, wherein Me can include a rare earth element, Zr, or any combination thereof; $0\leq d<1$; and X can include one or more halogen and optionally an anion group such as amide ($-NH_2$), hydroxide ($-OH$), and $-BF_4$. In particular examples, d may be greater than 0, such as at least 0.2. In another particular example, d may be at most 0.5. In particular examples, Me can include Y, Gd, Zr, Sc, or a combination thereof. In a further example, the halogen can include at least one, at least two, or at least three of Cl, Br, and I. In a particular example, the halogen can be Cl, Br, or a combination of Cl and Br. In another particular example, the halogen can be a combination of Cl, Br, and I. In still another particular example, the halogen can be F.

In another particular embodiment, A may be represented by $(NH_4)_nLi_3Me^{k+}F_{3+k+n}$, and B can be represented by $(Li_{1-d}Na_d)_2LiMe^{k+}F_{3+k}$, wherein Me can include a rare earth element, Zr, or any combination thereof; and $0\leq d<1$. In implementations, A and/or B may be optionally doped with an anion group including ($-NH_2$), hydroxide ($-OH$), $-BF_4$, or a combination thereof. In particular examples, d may be greater than 0, such as at least 0.2. In another particular example, d may be at most 0.5. In another particular example, Me can include Y or a combination of Y and one or more element of Gd, Zr, and Sc.

In another embodiment, A can be represented by $(NH_4)_n(Li_{(1-d)}Na_{(d)})_2Li_{(1-z)}$ $Me^{3+}_{(1-u-p-q-r)}Me^{4+}_{(u)}Me^{2+}_{(p)}Me^{5+}_{(q)}$ $Me^{6+}_{(r)}(Cl_{(1-y-w)}Br_{(y)}I_{(w)})_{(6+u-p+2q+3r-z+n)}$, and B can be represented by $(Li_{(1-d')}, Na_{(d')})_2Li_{(1-z)}Me^{3+}{}_{(1-u-v-v)}Me^{4+}{}_{(u)}Me^{2+}{}_{(p)}Me^{5+}{}_{(q)}Me^{6+}{}_{(r)}(Cl_{(1-y-w)}Br_{(y)}I_{(w)})_{(6+u-p+2q+3r-z'+n)}$, wherein $0 \leq d < 1$; $0 \leq d' < 1$; $0 < n$, $-1 \leq z < 1$, $-1 \leq z' < 1$; n=0.33 or 0.5 or 1 or 1.5 or 2 or 3 or 4 when z=1; $Me^{3+}$ includes a rare-earth element, In, Bi or any combination thereof; $Me^{4+}$ is $Zr^{4+}$, $Hf^{4+}$, $Ti^{4+}$, $Sn^{4+}$, $Th^{4+}$, or any combination thereof; $Me^{2+}$ is $Mg^{2+}$, $Zn^{2+}$, $Ca^{2+}$, $Sr^{2+}$, $Ba^{2+}$, or any combination thereof; $Me^{5+}$ is $Ta^{5+}$, $Nb^{5+}$, $W^{5+}$, $Sb^{5+}$, or any combination thereof; $Me^{6+}$ is $W^{6+}$; $0 <= x <= 1$; $0 <= y <= 1$; $-0.95 < z < 0.95$; $0 <= u < 0.95$; $0 <= p < 0.95$; $0 <= q < 0.95$; $0 <= r < 0.95$; and $w <= 1$. When z=0, A can be stoichiometric. When z is not zero, A can be non-stoichiometric. In a particular instance, $-0.95 < z < 0.95$. In a more particular aspect, d=e=0, p=0, q=0, and r=0, and in even more particular aspect, w=0.

In certain instances, A may be represented by $NH_4X$ and B may be a complex metal halide compound having a general formula of MM'X. An example of such compound can include $LiCsCl_2$ and $Li_2CsCl_3$. The ammonium-containing complex metal halide can be an eutectic-like composition of $NH_4X+LiCsCl_2$ or $NH_4X+LiCsCl_3$.

In an embodiment, A and B can include the same halogen element. In particular examples, the halogen element of A and B can be the same. In at least one embodiment, A may be free of alkali metal. In another embodiment, A and B can include the same alkali metal. In particular examples, the alkali metal of A and B can be the same. In more particular examples, A and B can include the same mol % of each alkali metal for the total of alkali metal in respective compound. In a further embodiment, A and B can include the same Me element, such as the same divalent element, trivalent element, tetravalent element, and/or pentavalent element. For example, A and B can include the same rare earth element. In particular examples, the rare earth element of A and B can be the same. In another example, A and B can include Zr. In more particular examples, A and B can include the same mol % of each Me element for the total of Me in the respective compound.

In a particular implementation, A can be $(NH_4)_3Li_3YCl_9$, and B can be $Li_3YCl_6$. In another particular implementation, A can be $(NH_4)_3Li_3YBr_9$, and B can be $Li_3YBr_6$. In yet another particular implementation, A can be $(NH_4)_3(Na_{0.5}, Li_{0.5})_2LiYCl_9$ and B can be $(Na_{0.5}, Li_{0.5})_2LiYCl_6$. In still another particular implementation, A can be $(NH_4)_3(Na_{0.5}, Li_{0.5})_2LiYBr_9$ and B can be $(Na_{0.5},Li_{0.5})_2LiYBr_6$. In still another particular implementation, A can be $(NH_4)_3Li_3Y_{0.8}Gd_{0.2}Br_9$ and B can be $Li_3Y_{0.8}Gd_{0.2}Br_6$. In still another particular implementation, A can be $(NH_4)_3Li_3GdBr_9$ and B can be $Li_3GdBr_6$. In still another particular implementation, A can be $(NH_4)_3Li_3Y_{0.8}Zr_{0.2}Br_{9.2}$ and B can be $Li_3Y_{0.8}Zr_{0.2}Br_{6.2}$. In still another particular implementation, A can be $(NH_4)_3(Na_{0.3},Li_{0.7})_2LiY_{0.7}Zr_{0.3}Br_{0.3}$ and B can be $(Na_{0.5},Li_{0.5})_2LiY_{0.7}Zr_{0.3}Br_{6.3}$. In another example, A may be represented by $NH_4Cl$, and B may be $LiCsCl_2$. In another example, A may be represented by $NH_4Cl$ and B may be $Li_2CsCl_3$. It is to be appreciated that A and/or B may be optionally doped with an anion group.

In a further embodiment, A may be constituted of $(NH_4)M_3Me^{k+}X_{3+k+n}$ and $(NH_4)_nMe^{k+}X_{3+k+n}$ and B can be represented by $M_3Me^{k+}X_{3+k}$, wherein $0 < n \leq 3$; M can include Li; Me can include a rare earth element, Zr, or any combination thereof. In particular examples, n=0.5 or 1 or 2 or 3. In another particular example, M can be Li or a combination of Li and Na. In further particular examples, RE can include Y, Gd, Zr, or a combination thereof. In another embodiment, $(NH_4)_nM_3Me^{k+}X_{3+k+n}$ and $(NH_4)_nMe^{k+}X_{3+k+n}$ may be present in different phases. In still another embodiment, the ammonium-containing complex metal halide can consist of a single phase including A and B, wherein A can be constituted of $(NH_4)_nM_3Me^{k+}X_{3+k+n}$ and $(NH_4)_nMe^{k+}X_{3+k+n}$.

In a further embodiment, a simple metal halide, such as rare earth halide (e.g., $YCl_3$) and/or alkali metal halide (e.g., LiCl), may be generated due to incomplete reactions between raw materials used to form the ammonium-containing complex metal halide. The simple metal halide may be present as an impurity of the ammonium-containing complex metal halide. In an embodiment, the ammonium-containing complex metal halide may include at most at most 15 wt % for the total weight of the ammonium-containing complex metal halide, such as at most 14 wt %, at most 13 wt %, at most 12 wt %, at most 11 wt %, at most 10 wt %, at most 9 wt %, at most 8 wt %, at most 7 wt %, at most 6 wt %, at most 5 wt %, at most 4 wt %, at most 3 wt %, at most 2 wt %, at most 1 wt %, at most 0.5 wt %, at most 0.4 wt %, at most 0.3 wt %, at most 0.2 wt %, at most 0.1 wt %, or at most 0.05 wt % for the total weight of the ammonium-containing complex metal halide. In particular examples, the simply metal halide may be present in an even lower content, such as at most 5 at % or at most 2.5 at %. In an example, the simple metal halide may be present in a different phase than A and B. In embodiments, the ammonium-containing complex metal halide can be essentially free of a simply metal halide. For instance, the metal halide may be less than 0.2 at %. Impurity can be detected by XRD analysis coupled with Rietveld refinements for quantitative analysis through the presence of characteristic diffraction peaks corresponding to the parasitic phases. Rietveld Refinements (RR) can be used to analyze the shape and position of the peaks at an XRD diagram to identify quantitatively the contribution of the various phases by collecting the 2θ data at XRD diffraction with a small incrementation of 2θ angle and converting the XRD data into ratio of different phases. When a impurity phase is presented in the powder sample at the molar or mass quantity below ~0.1%-0.3%, the impurity may not generate an XRD peak strong enough to be used for identification of the impurity phase by XRD coupled with Rietveld Refinements. Other analysis may be used to determine impurity phase at low quantity. An exemplary analysis may include LECO.

In an embodiment, the electrolyte material can consist of the ammonium-containing complex metal halide. In an aspect, the electrolyte material can consist of the ammonium-containing complex metal halide including a single phase of the ammonium-containing complex metal halide and one or more impurity phases when impurity is present. In particular, the content of one or more impurity phases can be reduced compared to a conventional complex metal halide. In a further aspect, the electrolyte material can consist of the ammonium-containing complex metal halide including a plurality of phases. For example, the electrolyte material can consist of the ammonium-containing complex metal halide consisting of phases A and B. In an aspect, the electrolyte material may be used as a raw material for forming an electrolyte, an electrode, or another component of an electrochemical device.

In an embodiment, a solid state electrolyte can include the solid electrolyte material. The solid state electrolyte can have improved ion conductivity compared to solid state electrolyte including conventional complex lithium-based halide that does not contain ammonium. In a particular example, the solid state electrolyte can consist of the solid electrolyte material. In more particular examples, the solid state electrolyte can consist of the ammonium-containing complex metal halide.

In an embodiment, a composite ion conductive layer can include the electrolyte material and an organic material. The organic material can include as a binder material, a polymeric electrolyte material, or a combination thereof. In another example, the composite ion conductive layer may include a plasticizer, a solvent, or a combination thereof. An exemplary organic material can include polytetrafluoroethylene (PTFE), polyvinylidene fluoride (PVdF), fluorine rubber, polypropylene, an ethylene-propylene-diene monomer (EPDM), sulfonated EPDM, natural butyl rubber (NBR), paraffin wax, polypropylene carbonate, polyisobutylene, polyvinyl pyrrolidone, polymethyl methacrylate, poly(propylene oxide), polyvinyl chloride, poly(vinylidene fluoride), poly(acrylonitrile), poly(dimethysiloxane), poly[bis(methoxy ethoxyethoxide)-phosphazene], polyethylene carbonate, polypropylene glycol, polycaprolactone, poly(trimethylene carbonate), hydrogenated nitrile butadiene rubber, poly(ethylene vinyl acetate), high density polyethylene, low density polyethylene, polyurethane, or any combination thereof. In another example, the composite ion conductive layer can include a lithium salt. An exemplary lithium salt can include $LiSbF_6$, $LiN(SO_2CF_3)_2$, $LiN(SO_2C_2F_5)_2$, $LiN(SO_2CF_3)(SO_2C_4F_9)$, $LiC(SO_2CF_3)_3$, $LiAsF_6$, $LiClO_4$, $LiPF_6$, $LiBF_4$, $LiCF_3SO_3$, or any combination thereof.

In another embodiment, a mixed electron and ion conductive layer can include the solid electrolyte material. In an aspect, the mixed electron and ion conductive layer can further include a cathode active material. An example of the cathode active material can include, but not limited to, lithium-containing transition metal oxides, such as $Li(Ni,Co,Al,Mn)O_2$ and $LiCoO_2$, transition metal fluorides, polyanions and fluorinated polyanion materials, and transition metal sulfides, transitions metal oxyfluorides, transition metal oxysulfides, transition metal oxynitrides, or the like, or any combination thereof.

In another aspect, the mixed ion and electron conductive layer can include an anode active material. An exemplary anode active material can include carbon materials, such as artificial graphite, graphite carbon fibers, resin baking carbon, pyrolytic vapor-grown carbon, coke, mesocarbon microbeads (MCMB), furfuryl alcohol resin-baked carbon, polyacene, pitch-based carbon fibers, vapor-grown carbon fibers, natural graphite, non-graphitizable carbon, or the like, metal materials including lithium metal, lithium alloy, or the like, oxides, nitrides, tin compounds, silicon compounds, or any combination thereof.

In an embodiment, a solid state lithium battery can include an electrolyte disposed between an anode and a cathode. Referring to FIG. 1, a portion of a cross section of an exemplary solid state battery 100 is illustrated. The electrolyte layer 102 can be any of the electrolyte or composite layer noted in embodiments herein. The anode 104 overlies the electrolyte 102. In an embodiment, the anode 104 can include the solid electrolyte material and an anode active material. In particular instances, the anode 104 may be a 3 dimensionally structured anode. In another embodiment, the anode 104 may be a metal anode. For instance, the anode may consist of lithium. The cathode 106 may be disposed on the other side of the electrolyte 106 opposite the anode 102. The cathode 106 can include the solid electrolyte material and an active cathode material. In a particular embodiment, the cathode 106 may be a 3 dimensionally structured cathode.

It is notable the conventional synthesis of a complex halide based on ammonium-halide is not applicable for forming the ammonium-containing complex metal halide, as some trivalent metal halides and tetravalent metal halides (i.e., rare earth halides) tend to form stable hydrate phases, rendering it difficult to completely remove the water molecules from the metal halide hydrates. Increasing the temperature can result in formation of undesired metal oxyhalide or metal oxyhydrate halide compounds at a higher concentration.

Figure 2:
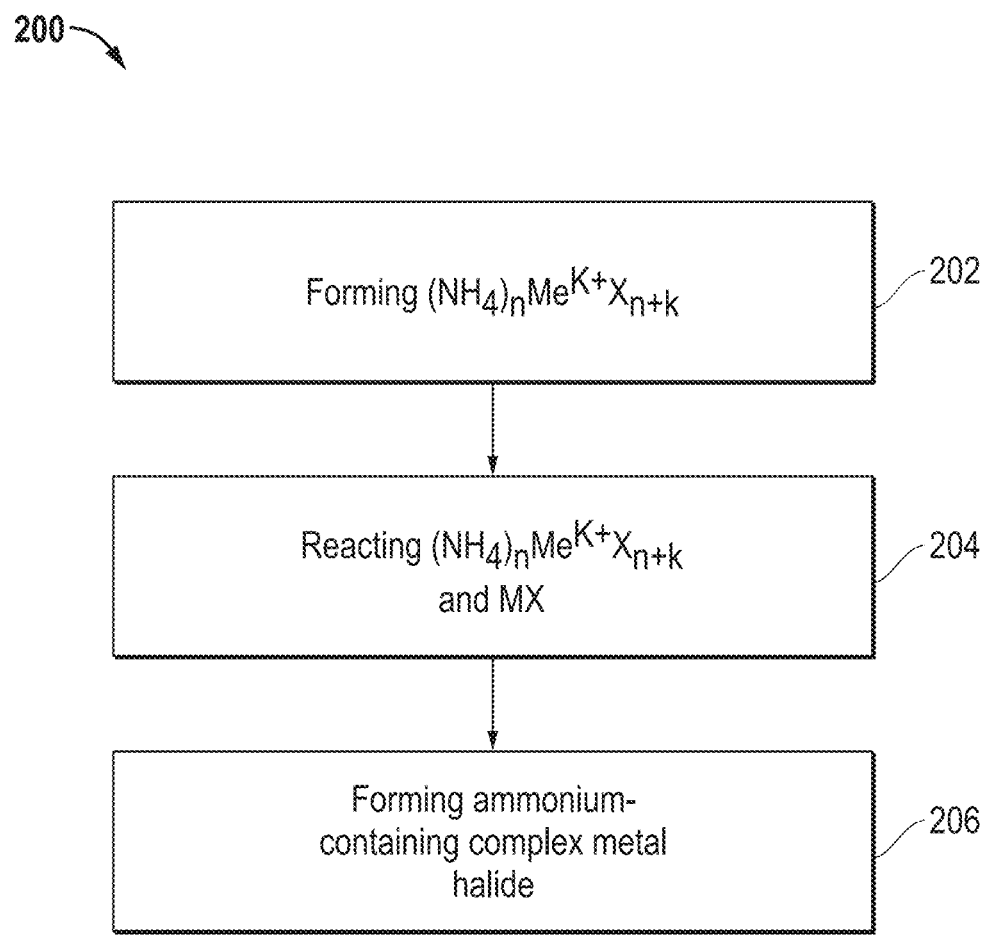
FIG. 2 includes a flowchart illustrating a process of forming a solid electrolyte material according to an embodiment.

Referring to FIG. 2, a process for forming the solid electrolyte material 200 is illustrated.

The process 200 may start at block 202. A reaction mixture may be formed including ammonium halide, metal compounds including one or more oxides of metal Me, alkali metal carbonate (e.g., lithium carbonate), and hydrochloric acid. In another example, sulfates, hydroxides, hydrates, oxalates, or other basic salts including lithium or Me metal may be used as raw materials in lieu of lithium carbonates and/or oxides of metal Me. Me can include a divalent, trivalent, tetravalent, pentavalent, hexavalent element, or a combination thereof, as noted in embodiments herein. In a particular instance, the metal compound can consist of alkali metal compounds, such as alkali metal halide.

An intermediate reaction product can include hydrated salts containing metal halides (e.g., rare earth halides). The moisture in the hydrated salt can be replaced with $NH_4X$ to form $(NH_4)_n Me^{k+} X_{n+k}$, wherein n>0. An exemplary reaction is illustrated below.

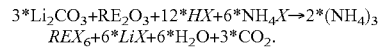
$3*Li_2CO_3+RE_2O_3+12*HX+6*NH_4X \rightarrow 2*(NH_4)_3 REX_6+6*LiX+6*H_2O+3*CO_2.$ In an instance, the reaction products may be filtered to remove larger particles to facilitate subsequent solid-state reactions. Larger particles can include impurities that come with any of the raw materials, remaining particles of the raw materials, carbon, or any combination thereof.

The reaction products can be dried to facilitate a solid state reaction of $(NH_4)_n Me^{k+} X_{3+k}$ and MX (e.g., LiX), wherein M can include one or more alkali metal element as noted in embodiments herein. Drying may be performed under vacuum or reduced pressure. The atmosphere may be, but not limited to, air, dry air, or nitrogen. Heat may be applied to aid evaporation of water. The heating temperature can be from 100° C. to 140° C. Drying may be conducted until a trace amount of water is left in the mixture, such as from 1 wt % to 3 wt %.

The process 200 can continue to block 204. In an instance, the solid state reaction of $(NH_4)_n Me^{k+} X_{3+k}$ and MX may be performed in a dry and neutral atmosphere. $N_2$ or Ar flow may be used to facilitate removal of the trace amount of water. In a particular instance, partially decomposing $(NH_4)_3 Me^{k+} X_{3+k}$ may be performed simultaneously with the solid state reaction.

In particular instances, the decomposition and solid state reaction may be carried out in a crucible made of a material that is inert to the reactants and products. For example, the crucible may be made of quartz, alumina, silica-alumina, BN, glassy carbon, or graphite. Graphite can have a pyrolytic carbon coating in particular implementations. In particular examples, the heating temperature can be in a range from 400° C. to 650° C. to allow partial sublimation of ammonium halide.

The process 200 may continue to block 206, forming the ammonium-containing complex metal halide. The resulted product after heating can be the ammonium-containing complex metal halide. For example, the ammonium-containing complex metal halide may be represented by $(NH_4)_n M_{3-z}(Me^{k+})_f X_{3+n-z+k*f}$ wherein n>0; 0≤z<3; 2≤k<6; 0≤f≤1. In particular instance, the ammonium-containing complex metal halide may be represented by $(NH_4)_nM_{3-z}Me^{k+}X_{3+n-z+k}$, wherein n>0; 0≤z<3; 2≤k<6.

Known techniques can be used to form an electrolyte a composite ion conductive layer, an anode, a cathode, or another component of a solid state lithium battery with the solid electrolyte material. Such techniques include, but not limited to, casting, molding, deposition, printing, pressing, heating, or the like, or any combination thereof. In particular implementations, for forming a multi-layer structure, the layers, such as electrolyte and anode and/or cathode may be formed separately and then laminated to form a multi-layer structure. Alternatively, a stack of green electrolyte and anode and/or cathode layers may be formed followed by a further treatment, such as pressing, extrusion, heating, drying, voltage application or any combination thereof to form the finally formed multi-layer structure.

In an example, the electrolyte material may be used as a coating for another component of an electrochemical device, such as a solid state battery. For instance, the electrolyte material can be deposited on a separator, such as an electrolyte layer.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A solid electrolyte material, comprising a material represented by $(NH_4)_nM_{3-z}(Me^{k+})_fX_{n+3-z+k*f}$, wherein 0<n, 0≤z<3, 2≤k<6, 0≤f≤1; M comprises at least one alkali metal element, X comprises at least a halogen, and Me comprises a divalent metal element, a trivalent metal element, a tetravalent metal element, a pentavalent metal element, a hexavalent metal element or any combination thereof.

Embodiment 2. A solid electrolyte material, comprising an ammonium-containing complex metal halide, wherein the metal comprises at least one alkali metal element, and wherein the complex metal halide exhibits ionic conductivity in bulk.

Embodiment 3. A solid electrolyte material, comprising an ammonium-containing complex metal halide constituted of $A_t$ and $B_{(1-t)}$, wherein $10^{-6}<t\leq1$, and A comprises ammonium and B is free of ammonium, and wherein the metal comprises at least one alkali metal element.

Embodiment 4. The solid electrolyte material of embodiment 3, wherein the ammonium-containing complex metal halide is represented by $(NH_4)_nM_{3-z}(Me^{k+})_fX_{n+3-z+k*f}$, wherein 0<n, 0≤z<3, 2≤k<6, 0≤f≤1, M comprises at least one alkali metal element, X comprises a halogen, and Me comprises a divalent metal element, a trivalent metal element, a tetravalent metal element, a pentavalent metal element, a hexavalent metal element or any combination thereof.

Embodiment 5. The solid electrolyte material of any one of embodiments 1 to 4, wherein the ammonium-containing complex metal halide comprises a single phase or a plurality of phases.

Embodiment 6. The solid electrolyte material of any one of embodiments 1 and 4 to 5, wherein M comprises at least one of Li and Na.

Embodiment 7. The solid electrolyte material of any one of embodiments 1 and 4 to 6, wherein M comprises K, Rb, Cs, or a combination thereof.

Embodiment 8. The solid electrolyte material of any one of embodiments 1 and 4 to 6, wherein M consists of Li and at least one of Na, K, Cs, and Rb.

Embodiment 9. The solid electrolyte material of any one of embodiments 1 and 4 to 8, wherein Me comprises one or more of a rare earth element, alkaline earth metal element, a 3d transition-metal, Zn, Ga, Al, Ge, Zr, Hf, Ti, Sn, Th, Ta, Nb, Mo, W, Sb, In, Bi or any combination thereof.

Embodiment 10. The solid electrolyte material of any one of embodiments 1 and 4 to 9, wherein X consists of at least one of F, Cl, Br, and I, and optionally, at least one of —$NH_2$ (amide), —$(NH)_{0.5}$ (imide), —OH (hydroxide), —$BH_4$ and —$BF_4$ groups.

Embodiment 11. The solid electrolyte material of any one of embodiments 1 to 10, wherein the ammonium-containing complex metal halide is represented by $(NH_4)_nLi_{3-z}(Me^{k+})_fX_{3-z+k*f+n}$.

Embodiment 12. The solid electrolyte material of any one of embodiments 1 and 2, wherein the ammonium-containing complex metal halide is constituted of $A_t$ and $B_{(1-t)}$, wherein $10^{-6}<t\leq1$, and A comprises ammonium and B is free of ammonium.

Embodiment 13. The solid electrolyte material of any one of embodiments 3 to 10 and 12, wherein A is represented by $(NH_4)_nLi_{3-z}(Me^{k+})_fX_{3-z+k*f+n}$, and B is represented by $(Li_{1-d-e}Na_dMe_e)_2Li_{1-z'}(Me'^{k+})_fX_{3-z'+k*f}$, wherein:

Me and Me' independently includes a rare earth element, Zr, a divalent metal element, a trivalent metal element other the rare earth, a tetravalent metal element other than Zr, a pentavalent element, a hexavalent element or any combination thereof;

M is K, Rb, Cs, or any combination thereof;

2≤k≤6;

0≤d≤1;

0≤e<1;

−1≤z'≤1;

0≤f≤1;

0<f'≤1;

0<n;

0≤z≤3;

n=0.33, 0.5 or 1 or 1.5 or 2 or 3 or 4 when z=3; and

X includes at least one halogen.

Embodiment 14. The solid electrolyte material of any one of embodiments 3 to 13, wherein A is represented by $(NH_4)_3Li_3YX_9$, and B is represented by $(Li_{1-d}Na_d)_2LiREX_6$, wherein RE comprises at least one rare earth element, 0≤d<1, and X includes at least one halogen.

Embodiment 15. The solid electrolyte material of embodiment 14, wherein X consists of the at least one halogen, and optionally at least one of —$NH_2$ or —OH, or —$BH_4$ or —$BF_4$.

Embodiment 16. The solid electrolyte material of embodiment 14 or 15, wherein RE is Y and the at least one halogen consists of at least one of Cl and Br.

Embodiment 17. The solid electrolyte material of embodiment 14, wherein RE is Y and the at least one halogen is F.

Embodiment 18. The solid electrolyte material of embodiment 14 or 15, wherein RE is Y and the at least one halogen consists of at least two of Cl, Br, I, and F.

Embodiment 19. The solid electrolyte material of embodiment 14 or 15, wherein RE is Y and the at least one halogen consists of Cl, Br, and I.

Embodiment 20. The solid electrolyte material of any one of embodiments 3 and 6 to 12, wherein A is represented by $(NH_4)(Me^{k+})_f X_{k*f+n}$, and B is represented by $M_2Li(Me^{k+})_f X_{3+k*f}$, wherein M comprises at least one alkali metal element, Me comprises at least one element selected from the group consisting of rare earth element and Zr, n=0.33 or 0.5 or 1 or 1.5 or 2 or 3 or 4, and X includes at least one halogen.

Embodiment 21. The solid electrolyte material of embodiment 20, wherein A is represented by $(NH_4)YX_{3+n}$, n=0.5, 1, 2, 3 and B is represented by $M_2LiREX_6$, wherein M is Li or Li and Na or Li and Cs, RE comprises at least one rare earth element, and X includes at least one halogen.

Embodiment 22. The solid electrolyte material of embodiment 20 or 21, wherein M consists of Li and Na or Li and K or Li and Cs, and wherein the halogen consists of at least one of Cl, Br, F, and I.

Embodiment 23. The solid electrolyte material of embodiment 20 or 21, wherein the at least one halogen consists of Br.

Embodiment 24. The solid electrolyte material of embodiment 20 or 21, wherein the at least one halogen consists of Cl.

Embodiment 25. The solid electrolyte material of embodiment 20 or 21, wherein the at least one halogen consists of at least two of Cl, Br, F, and I.

Embodiment 26. The solid electrolyte material of embodiment 20 or 21, wherein the at least one halogen consists of Cl, Br, and I.

Embodiment 27. The solid electrolyte material of embodiment 20 or 21, wherein the at least one halogen consists of F.

Embodiment 28. The solid electrolyte material of embodiment 20 or 21, wherein RE consists of at least one of La, Ce, Gd, Er, Yb, Sc, and Y.

Embodiment 29. The solid electrolyte material of any one of embodiments 21 to 28, wherein RE is Y.

Embodiment 30. The solid electrolyte material of any one of embodiments 1 to 5, wherein the complex ammonium-containing metal halide is represented by $(NH_4)_n(Li_{(1-d-e)}Na_{(d)}M'_{(e)})_2Li_{(1-z)}Me^{3+}_{(1-u-p-q-r)}Me^{4+}_{(u)}Me^{2+}_{(p)}Me^{5+}_{(q)}Me^{6+}_{(r)}(Cl_{(1-y-w)}Br_{(y)}I_{(w)})_{(6+u-p+2q+3r-z+n)}$, $0<n$;

$-1 \leq z<1$;

$0 \leq d<1$;

$0 \leq e<1$;

$M^{3+}$ includes a rare-earth element, In, Bi, Ga, Al, Sb, Sn or any combination thereof;

M' is K, Rb, Cs, or any combination thereof;

$Me^{4+}$ is $Zr^{4+}$, $Hf^{4+}$, $Ti^{4+}$, $Sn^{4+}$, $Th^{4+}$, $Ge^{4+}$ or any combination thereof;

$Me^{2+}$ is $Mg^{2+}$, $Zn^{2+}$, $Ca^{2+}$, $Sr^{2+}$, $Ba^{2+}$, $Yb^{2+}$, $Eu^{2+}$ or any combination thereof;

$Me^{5+}$ is $Ta^{5+}$, $Nb^{5+}$, $W^{5+}$, $Sb^{5+}$, or any combination thereof;

$Me^{6+}$ is $W^{6+}$, $Mo^{6+}$, or any combination thereof;

$0<=w<=1$;

$0<=y<=1$;

$0<=u<0.95$;

$0<=p<0.95$;

$0<=q<0.95$;

$0<=r<0.95$.

Embodiment 31. The solid electrolyte material of embodiment 3 or 11, wherein A is represented by $(NH_4)_n(Li_{(1-d-e)},Na_{(d)}M'_{(e)})_2Li_{(1-z)}Me^{3+}_{(1-u-p-q-r)}Me^{4+}_{(u)}Me^{2+}_{(p)}Me^{5+}_{(q)}Me^{6+}_{(r)}(Cl_{(1-y-w)}Br_{(y)}I_{(w)})_{(6+u-p+2q+3r-z+n)}$, and B is represented by $(Li_{(1-d'-e')},Na_{(d')}M'_{(e')})_2Li_{(1-z')}Me^{3+}_{(1-u-v-w)}Me^{4+}_{(u)}Me^{2+}_{(p)}Me^{5+}_{(q)}Me^{6+}_{(r)}(Cl_{(1-y-w)}Br_{(y)}I_{(w)})_{(6+u-p+2q+3r-z')}$, wherein $0<n$;

n=0.33 or 0.5 or 1 or 1.5 or 2 or 3 or 4 when z=1, $0 \leq d<1$;

$0 \leq e<1$;

$0 \leq d'<1$;

$0 \leq e'<1$;

$-1 \leq z<1$;

$-1 \leq z'<1$;

M is K, Rb, Cs, or any combination thereof;

$M^{3+}$ includes a rare-earth element, In, Bi, Ga, Al, Sb, Sn or any combination thereof;

$Me^{4+}$ is $Zr^{4+}$, $Hf^{4+}$, $Ti^{4+}$, $Sn^{4+}$, $Th^{4+}$, $Ge^{4+}$ or any combination thereof;

$Me^{2+}$ is $Mg^{2+}$, $Zn^{2+}$, $Ca^{2+}$, $Sr^{2+}$, $Ba^{2+}$, or any combination thereof;

$Me^{5+}$ is $Ta^{5+}$, $Nb^{5+}$, $W^{5+}$, $Sb^{5+}$, or any combination thereof;

$Me^{6+}$ is $W^{6+}$, $Mo^{6+}$, or any combination thereof;

$0<=w<=1$;

$0<=y<=1$;

$0<=u<0.95$;

$0<=p<0.95$;

$0<=q<0.95$;

$0<=r<0.95$.

Embodiment 32. The solid electrolyte material of any one of embodiments 3 and 6, comprising a first phase including ammonium and a second phase including B, wherein the second phase consists of B.

Embodiment 33. The solid electrolyte material of embodiment 32, where the first phase including A and free of B.

Embodiment 34. The solid electrolyte material of embodiment 32, further comprising a third phase including ammonium, wherein the first phase and the third phase comprise a different composition.

Embodiment 35. The solid electrolyte material of embodiment 34, wherein the first phase and third phase constitute A.

Embodiment 36. The solid electrolyte material of any one of embodiments 32 to 35, wherein the second phase comprises or consists of $Li_3REX_6$, wherein RE comprises a rare earth element, Zr, or a combination thereof and X consist of one or more halogen and optionally an anion group.

Embodiment 37. The solid electrolyte material of any one of embodiments 32 to 36, wherein the first phase comprises $(NH_4)_3Li_3Me^{k+}X_{6+k}$ or $(NH_4)_3Me^{k+}X_{3+k}$ wherein Me comprises a rare earth element, Zr, or a combination thereof, and X consists of one or more halogen and optionally an anion group.

Embodiment 38. The solid electrolyte material of any one of embodiments 34 to 37, wherein the first phase comprises $(NH_4)_3Li_3RE^{k+}X_{6+k}$ and the third phase comprises $(NH_4)_3RE''X_{3+k}$, wherein RE comprises a rare earth element, Zr, or a combination thereof, and X consist of one or more halogen and optionally anion group.

Embodiment 39. The solid electrolyte material of any one of embodiments 3 to 38, wherein $t \geq 0.01$.

Embodiment 40. The solid electrolyte material of any one of embodiments 3 to 39, wherein $t \leq 0.2$.

Embodiment 41. The solid electrolyte material of any one of embodiments 1 to 40, comprising an ionic conductivity in bulk of at least 0.6 mS/cm, at least 1.2 mS/cm, at least 1.8 mS/cm, or at least 2.2 mS/cm.

Embodiment 42. The solid electrolyte material of any one of embodiments 1 to 41, comprising an ionic conductivity in bulk of at most 8 mS/cm, at most 7.2 mS/cm, or at most 6.2 mS/cm.

Embodiment 43. The solid electrolyte material of any one of embodiments 1 to 40 and 42, exhibiting an ionic conductivity at least 0.5 mS/cm, or at least 0.1 mS/cm, or at least 0.01 mS/cm, or at least 0.001 mS/cm.

Embodiment 44. A solid electrolyte layer, comprising the solid electrolyte material of any one of embodiments 1 to 43.

Embodiment 45. The mixed electron and ion conductive layer comprising the solid electrolyte material of any one of embodiments 1 to 43 and a cathode or anode active material with an optional electron-conductive additive.

Embodiment 46. A solid state lithium battery, comprising the solid electrolyte layer of embodiment 44.

Embodiment 47. A solid state lithium battery, comprising the mixed electron and ion conductive layer of embodiment 45.

Embodiment 48. A process of forming a solid state electrolyte material, comprising:

forming $(NH_4)_nMe^{k+}X_{n+k}$, wherein forming $(NH_4)$, $Me^{k+}X_{n+k}$ comprises replacing moisture in a hydrated salt containing $Me^{k+}X_k$ with $NH_4X$, wherein Me comprises a rare earth element, Zr, or a combination thereof; and X is one or more halogen, wherein Me comprises a divalent, trivalent, tetravalent, pentavalent, hexavalent, or a combination thereof.

Embodiment 49. The process of embodiment 48, further comprising performing a solid state reaction of $(NH_4)_nMe^{k+}X_{n+k}$ and MX, wherein M comprises an alkali metal element.

Embodiment 50. The process of embodiment 48 or 49, further comprising partially decomposing $(NH_4)_nMe^{k+}X_{n+k}$.

Embodiment 51. The process of embodiment 50, wherein partially decomposing $(NH_4)_nMe^{k+}X_{n+k}$ is performed at a same time as the solid state reaction.

Embodiment 52. The process of any one of embodiments 48 to 51, further comprising forming $(NH_4)_nM_{3-z}Me^{k+}X_{n+k-z}$, wherein $-3 \leq z < 3$.

EXAMPLES

Example 1

Ammonium-containing complex metal halide samples were synthesized according to embodiments herein. Compositions and properties of the compound are included in Table 1. The samples are pressed dense ceramic pellets. Some samples are polished. Ion conductivity in bulk is determined by AC electrochemical impedance spectroscopy within 3 MHz and 10 Hz using a sinusoidal voltage amplitude between 5 and 100 mV, and in a blocking electrode configuration using Au plated electrodes and/or in a non-blocking electrode configuration using porous graphite anode.

The contents of the impurities of simple metal halide (e.g., LiX and/or $MeX_k$) that were present in the samples are included in Table 1 and were determined by X-ray diffraction analysis coupled with Rietveld refinements for quantitative analysis.

TABLE 1

| Samples | Composition | Measured Ionic Conductivity, mS/cm | Impurities concentration |
|---|---|---|---|
| 1 | $0.15*(NH_4)_3Li_3YCl_9$ + $0.85*Li_3YCl_6$ | 3.0 | Not detectable, below ~0.2 at % |
| 2 | $0.05*(NH_4)_3Li_3YCl_9$ + $0.95*Li_3YCl_6$ | 2.2 | Not detectable, below ~0.2 at % |
| 3 | $0.01*(NH_4)_3Li_3YCl_9$ + $0.99*Li_3YCl_6$ | 0.6 | Not detectable, below ~0.2 at % |
| 4 | $0.20*(NH_4)_3Li_3YBr_9$ + $0.80*Li_3YBr_6$ | 6.2 | Not detectable, below ~0.2 at % |
| 5 | $0.05*(NH_4)_3Li_3YBr_9$ + $0.95*Li_3YBr_6$ | 4.2 | Not detectable, below ~0.2 at % |
| 6 | $0.1*(NH_4)_3(Na_{0.5},Li_{0.5})_2LiYCl_9$ + $0.9*(Na_{0.5},Li_{0.5})_2LiYCl_6$ | 2.5 | 2.2 at % LiCl |
| 7 | $0.15*(NH_4)_3(Na_{0.5},Li_{0.5})_2LiYBr_9$ + $0.85*(Na_{0.5},Li_{0.5})_2LiYBr_6$ | 3.4 | Not detectable, below ~0.2 at % |
| 8 | $0.07*(NH_4)_3(Na_{0.5},Li_{0.5})_2LiYBr_9$ + $0.93*(Na_{0.5},Li_{0.5})_2LiYBr_6$ | 2.8 | 1.7 at % LiBr |
| 9 | $0.15*(NH_4)_3Li_3Y_{0.8}Gd_2Br_9$ + $0.85*Li_3Y_{0.8}Gd_{0.2}Br_6$ | 3.6 | Not detectable, below ~0.2 at % |
| 10 | $0.15*(NH_4)_3Li_3GdBr_9$ + $0.85*Li_3GdBr_6$ | 2.1 | 2.1 at % LiBr |
| 11 | $0.1*(NH_4)_3Li_3GdCl_9$ + $0.9*Li_3GdCl_6$ | 1.8 | 2.4 at % b LiCl |
| 12 | $0.1*(NH_4)_3(Li_{0.8},Na_{0.2})_2LiY_{0.8}Zr_{0.2}Cl_{9.2}$ + $0.9*(Li_{0.8},Na_{0.2})_2LiY_{0.8}Zr_{0.2}Cl_{6.2}$ | 4.8 | Not detectable, below ~0.2 at % |
| 13 | $0.2*(NH_4)_3(Li_{0.7},Na_{0.3})_2LiY_{0.7}Zr_{0.3}Br_{9.3}$ + $0.8*(Li_{0.7},Na_{0.3})_2LiY_{0.7}Zr_{0.3}Br_{6.3}$ | 7.2 | Not detectable, below ~0.2 at % |
| 14 | $0.2*(NH_4)_3Li_3YBr_9 + 0.8*Li_3YBr_6$ | 5.7 | Not detectable, below ~0.2 at % |

Example 2

Additional samples were formed. Sample 15 were synthesized by using a stoichiometric mixture of LiBr and $YBr_3$ compounds in welded quartz ampoule under vacuum with heat up to 650° C. After the reaction mixture melted, a soak time of up to an hour at 650° C. was applied to ensure reaction products are dissolved in the self flux. Then the temperature of the quartz ampoule was dropped down promptly (in 2-3 minutes) to 400° C. to help minimize partial decompositions of the incongruent $Li_3YBr_6$ phase. Then the temperature of the quartz ampoule was decreased progressively to room temperature at a rate 50-100° C./hour.

Samples 16 and 17 were synthesized according to embodiments herein voluntarily keeping residual ammonium. The quantity of residual ammonium was estimated by posterior overheating of a compound up to the malting temperature permitting to fully sublimate ammonium halide from the charge. Ionic conductivity in bulk of the samples were measured in the similar manner as described in Example 1.

| Sample | Compound | Ionic conductivity, mS/cm |
|---|---|---|
| 15 | $Li_3YBr_6$ | 1.6 |
| 16 | $Li_3YBr_6$ + 0.001 $NH_4Br$ | 1.9 |
| 17 | $Li_3YBr_6$ + 0.2 $NH_4Br$ | 2.5 |

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A solid electrolyte material, comprising a material including an ammonium-containing complex metal halide represented by $(NH_4)_n M_{3-z}(Me^{k+})_f X_{n+3-z+k*f}$, wherein $0<n$, $0 \leq z < 3$, $2 \leq k < 6$, $0 \leq f \leq 1$; M comprises an alkali metal element, X comprises a halogen, and Me comprises a divalent metal element, a trivalent metal element, a tetravalent metal element, a pentavalent metal element, a hexavalent metal element or any combination thereof.

2. The solid electrolyte material of claim 1, wherein the ammonium-containing complex metal halide is constituted of $A_t$ and $Bu_{(1-t)}$, wherein $t \geq 0.01$ and $t \geq 0.2$, and wherein A comprises ammonium and B is free of ammonium.

3. The solid electrolyte material of claim 2, wherein A is represented by $(NH_4)_n Li_{3-z}(Me^{k+})_f X_{3-z+k*f+n}$, and B is represented by $(Li_{1-d-e}Na_d M_e)_2 Li_{1-z'}(Me'^{k+})_f X_{3-z'+k*f}$, wherein:

Me and Me' independently includes a rare earth element, Zr, a divalent metal element, a trivalent metal element other the rare earth, a tetravalent metal element other than Zr, a pentavalent element, a hexavalent element or any combination thereof;

M is K, Rb, Cs, or any combination thereof;

$2 \leq k \leq 6$;

$0 \leq d \leq 1$;

$0 \leq e < 1$;

$-1 \leq z' \leq 1$;

$0 \leq f \leq 1$;

$0 < f' \leq 1$;

$0 < n$;

$0 \leq z \leq 3$;

$n=0.33$, 0.5 or 1 or 1.5 or 2 or 3 or 4 when $z=3$; and

X includes at least one halogen and optionally at least one of $—NH_2$ or $—OH$, or $—BH_4$ or $—BF_4$.

4. The solid electrolyte material of claim 1, wherein Me comprises one or more of a rare earth element, alkaline earth metal element a 3d transition-metal, Zn, Ga, Al, Ge, Zr, Hf, Ti, Sn, Th, Ta, Nb, Mo, W, Sb, In, Bi or any combination thereof.

5. The solid electrolyte material of claim 4, wherein M comprises at least one of Li and Na.

6. The solid electrolyte material of claim 2, wherein Me consists of at least one of La, Ce, Gd, Er, Yb, Sc, and Y.

7. The solid electrolyte material of claim 6, wherein the material is represented by $(NH_4)_n Li_{3-z}(Me^{k+})_f X_{3-z+k*f+n}$.

8. The solid electrolyte material of claim 1, wherein the complex ammonium-containing metal halide is represented by $(NH_4)_n (Li_{(1-d-e)}Na_{(d)}M'_{(e)})_2 Li_{(1-z)}Me^{3+}_{(1-u-p-q-r)}Me^{4+}_{(u)}Me^{2+}_{(p)}Me^{5+}_{(q)}Me^{6+}_{(r)}(Cl_{(1-y-w)}Br_{(y)}I_{(w)})_{(6+u-p+2q+3r-z+n)}$, $0<n$;

$-1 \leq z<1$;

$0 \leq d<1$;

$0 \leq e<1$;

$M^{3+}$ includes a rare-earth element, In, Bi, Ga, Al, Sb, Sn or any combination thereof;

M' is K, Rb, Cs, or any combination thereof;

$Me^{4+}$ is $Zr^{4+}$, $Hf^{4+}$, $Ti^{4+}$, $Sn^{4+}$, $Th^{4+}$, $Ge^{4+}$ or any combination thereof;

$Me^{2+}$ is $Mg^{2+}$, $Zn^{2+}$, $Ca^{2+}$, $Sr^{2+}$, $Ba^{2+}$, $Yb^{2+}$, $Eu^{2+}$ or any combination thereof;

$Me^{5+}$ is $Ta^{5+}$, $Nb^{5+}$, $W^{5+}$, $Sb^{5+}$, or any combination thereof;

$Me^{6+}$ is $W^{6+}$, $Me^{6+}$, or any combination thereof;

$0<=w<=1$;

$0<=y<=1$;

$0<=u<0.95$;

$0<=p<0.95$;

$0<=q<0.95$;

$0<=r<0.95$.

9. The solid electrolyte material of claim 2, wherein A is represented by $(NH_4)(Me^{k+})_f X_{k*f+n}$, and B is represented by $M_2Li(Me^{k+})_f X_{3+k*f}$, wherein M comprises at least one alkali metal element, Me comprises at least one element selected from the group consisting of rare earth element and Zr, n=0.33 or 0.5 or 1 or 1.5 or 2 or 3 or 4, and X includes at least one halogen.

10. The solid electrolyte material claim 2, wherein A is represented by $(NH_4)_3Li_3YX_9$, and B is represented by $(Li_{1-d}Na_d)_2LiREX_6$, wherein RE comprises at least one rare earth element, 0≤d<1, and X includes at least one halogen.

11. The solid electrolyte material claim 10, wherein X consists of at least one of F, Cl, Br, and I, and optionally, at least one of —$NH_2$ (amide), —$(NH)_{0.5}$ (imide), —OH (hydroxide), —$BH_4$ and —$BF_4$ groups.

12. The solid electrolyte material of claim 2, wherein A is represented by $(NH_4)_n YX_{3+n}$, n=0.5, 1, 2, or 3 and B is represented by $M_2LiREX_6$, wherein M is Li or Li and Na or Li and Cs, RE comprises at least one rare earth element, and X includes at least one halogen.

13. The solid electrolyte material of claim 1, wherein the ammonium-containing complex metal halide comprises a single phase or a plurality of phases.

14. The solid electrolyte material of claim 2, comprising a first phase including ammonium and a second phase including B.

15. The solid electrolyte material of claim 2, wherein the first phase comprises A and is free of B.

16. The solid electrolyte material of claim 14, wherein the second phase consists of B.

17. The solid electrolyte material of claim 14, further comprising a third phase including ammonium, wherein the first phase and the third phase constitute A.

18. The solid electrolyte material of claim 14, wherein the second phase comprises $Li_3REX_6$, wherein RE comprises a rare earth element, Zr, or a combination thereof and X consist of one or more halogen and optionally an anion group.

19. The solid electrolyte material of claim 14, wherein the first phase comprises $(NH_4)_3Li_3Me^{k+}X_{6+k}$ or $(NH_4)Me^{k+}X_{3+k}$ wherein Me comprises a rare earth element, Zr, or a combination thereof, and X consists of one or more halogen and optionally an anion group.

20. The solid electrolyte material of claim 17, wherein the first phase comprises $(NH_4)_3Li_3RE^{k+}X_{6+k}$ and the third phase comprises $(NH_4)_3RE^{k+}X_{3+k}$, wherein RE comprises a rue earth element, Zr, or a combination thereof, and X consist of one or more halogen and optionally anion group.

* * * * *

UNITED STATES PATENT AND TRADEMARK OFFICE
CERTIFICATE OF CORRECTION

PATENT NO. : 11,522,217 B2
APPLICATION NO. : 17/230625
DATED : December 6, 2022
INVENTOR(S) : Vladimir Ouspenski It is certified that error appears in the above-identified patent and that said Letters Patent is hereby corrected as shown below:

In the Claims

Column 20, Line 9, Claim 2, please delete "$Bu_{(1-t)}$,", and insert --$B_{(1-t)}$,--

Column 20, Line 9, Claim 2, please delete "$t \geq 0.2$,", and insert --$t \leq 0.2$,--

Column 20, Line 23, Claim 3, please delete "$0 \leq d \leq 1$;", and insert --$0 \leq d < 1$;--

Column 20, Lines 25-27, Claim 3, please delete "$0 \leq e < 1$;
$-1 \leq z' \leq 1$;", and insert
--$0 \leq e < 1$;
$0 <= (d+e) < 1$;
$-1 \leq z' \leq 1$;--

Column 20, Line 41, Claim 4, please delete "metal element a 3d", and insert --metal element, a 3d--

Column 20, Line 62, Claim 8, please delete "$M^{3+}$", and insert --$Me^{3+}$--

Column 21, Line 3, Claim 8, please delete "$Me^{6+}$,", and insert --$Mo^{6+}$,--

Column 21, Line 17, Claim 9, delete "$(NH_4)(Me^{k+})_f X_{k*f+n}$,", and insert --$(NH_4)_n(Me^{k+})_f X_{k*f+n}$,--

Column 21, Line 27, Claim 11, please delete "material claim", and insert --material of claim--

Column 22, Line 22-23, Claim 19, please delete "$(NH_4)Me^{k+}X_{3+k}$", and insert
--$(NH_4)_3 Me^{k+} X_{3+k}$--

Column 22, Line 28-29, Claim 20, please delete "a rue earth", and insert --a rare earth--

Signed and Sealed this
Twenty-second Day of October, 2024

Katherine Kelly Vidal
*Director of the United States Patent and Trademark Office*